Inventor
Rudolf Zeiringer
By
Watson Cole Grindle & Watson
Attys.

Inventor
Rudolf Zeiringer
By
Watson, Cole, Grindle + Watson
Attys.

United States Patent Office 3,461,327
Patented Aug. 12, 1969

3,461,327
PIEZOELECTRIC PRESSURE TRANSDUCER
Rudolf Zeiringer, Graz, Austria, assignor to
Hans List, Graz, Austria
Filed Dec. 6, 1966, Ser. No. 599,530
Claims priority, application Austria, Dec. 9, 1965,
A 11,100/65; Feb. 8, 1969, A 1,149/69
Int. Cl. H02n 9/02; H04r 17/00
U.S. Cl. 310—8.9                                    10 Claims

ABSTRACT OF THE DISCLOSURE

A piezoelectric pressure transducer of the pressure measuring type that includes a housing, a cooling chamber and a piezoelectric transducer mounted within the housing. The novelty resides in elimination of the changes of the negative bias of the measuring element by short time temperature shocks. This is done by an attachment to the housing to impede the flow of heat along the bottom of the housing.

---

Figure 1:
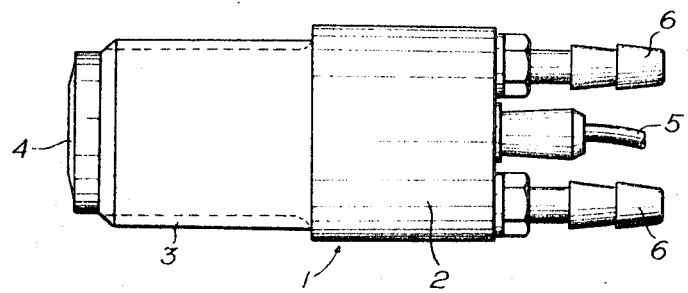

The invention relates to a piezoelectric pressure transducer comprising a prestressing sleeve surrounded by a cooling liquid chamber and containing the piezoelectric element, the said cooling liquid chamber being closed by means of a membrane adjoining the lower portion of the prestressing sleeve. With similar pressure transducers which are frequently subject to substantial thermal stresses, provision must be made for temperature compensation in order to avoid measuring errors due to differences in the thermal expansion of vital transducer elements. With conventioal types of transducers temperature compensation is achieved by the use of possibly identical materials or else of materials having substantially the same thermal expansion, at least as far as the transducer housing and the prestressing sleeve are concerned, combined with a particular shape of the membrane. Another conventional means of balancing different thermal expansions of the metallic prestressing sleeve and of the piezoelectric element enclosed therein consists in the provision of a metal disk of appropriate dilational properties inserted between the piezoelectric element and the bottom of the prestressing sleeve.

However, practical experience with conventional pressure-compensated transducers goes to show that temperature compensation takes some time, say, one to five seconds depending on the type used, to become fully effective and is maintained as long as substantially stable temperature conditions prevail. If the effect of temperature is short-lived (temperature shock), conventional temperature-compensated pressure transducers were found to record pressure variations when the pressure was actually constant. Consequently, the reliability of measurements diminishes as a result of this behavior, and in particular, pressure measurements become rather problematic in the event of short-lived peak temperatures.

It is the purpose of the present invention to eliminate the objectionable effects of temporary temperature influences and to provide a pressure transducer capable of measuring fully effective temperature compensation for all operating conditions. According to the invention this is achieved by providing a heat insulator and/or a heat localizer below the bottom of the prestressing sleeve, thereby considerably retarding the interchange of heat between the hot pressure medium and such elements of the pressure transducer as are particularly liable to deformation due to temperature, such as, for example, the membrane itself but also the prestressing sleeve. As a result, high but short-lived thermal stresses will not affect the state of stress of the piezoelectric element and consequently, have no bearing upon the result of the measurements. The heat insulators and/or heat localizers can be arranged in such a manner that particularly temperature-sensitive transducer elements, in particular the membrane, are subject to a possibly uniform allround heating. Accordingly, insulators and/or localizers should preferably be located in such places as are liable to rapidly assume high temperatures either as a result of inadequate cooling or unfavorable cross-sectional area ratios. Uniform heating of temperature-sensitive transducer elements according to the invention not only eliminates thermal stresses in those members liable to cause deformations, but also facilitates approximation to the stationary thermal condition of the transducer which prevails in continuous operation. Consequently, a temperature-compensated transducer is no more affected by temporary thermal stresses than by a continuous thermal stress.

Where a heat insulator is used for the purpose, the same can be designed according to the invention as a coating or disk made of some heat-insulating material and applied to the outer surface of the membrane. The mid-portion of the membrane adjoining the bottom of the prestressing sleeve and not directly washed by the cooling liquid constitutes an area subject to particularly high thermal stresses, whose temperature rises much more quickly than that of the remaining elements of the membrane which are in part directly washed by the cooling liquid. The insulator mounted on the outer surface of the membrane protects the mid-portion of the membrane against the direct influence of outside heat so as to achieve substantially uniform heating of the whole membrane. Without this protection by the heat insulator, deformation of the membrane subject to greater heat in its mid-portion would be inevitable, since the membrane which was mounted under prestress with a view to eliminating clearance flexibility and for the purpose of transmitting both positive and negative pressure measurements, behaves like an arcuate plate whose curvature varies as a result of irregular heating and/or cooling. Therefore, any rise in temperature of the central portion of the membrane would entail a corresponding increase of the curvature and consequently, a diminution of the contact pressure of the membrane applied against the bottom of the prestressing sleeve. This risk is precluded by the insulating coating protecting the central portion of the membrane.

However, uniform heating of the membrane can also be achieved by means of a heat localizer which according to the invention is formed by the cylindrical central portion of the membrane which presents a greater wall thickness than the rest. As a result of its greater thickness the central portion of the membrane is capable of accumulating a greater amount of heat so that this portion of the membrane takes longer to increase its temperature than does a membrane whose wall thickness is the same throughout. By appropriately dimensioning the reinforced portion of the membrane it is possible to achieve uniform heating of the entire membrane, thereby suppressing the error caused by temporary temperature influences.

According to a preferred embodiment of the invention providing for the simultaneous use of a heat insulator and of a heat localizer, the reinforced cylindrical mid-portion of the membrane is designed as an inwardly protruding lug adjoining the bottom of the prestressing sleeve with its entire surface, a cylindrical recess containing a heat-insulating coating being provided on the outside of the said lug. In addition to the heat-insulating lug and the heat localizer, the surfaces of the inwardly protruding lug of the membrane which are now directly washed by the cooling liquid participate in the retardation of the temperature balance between the heat carrier and the central portion of the membrane. The inwardly protruding lug also takes care of various applications of the transducer where an outwardly protruding central portion of the membrane would not be convenient. Moreover, a membrane having a plane periphery is better protected against mechanical damage.

According to another embodiment of the invention providing for the use of an annular membrane and for the arrangement of a heat insulator, the latter can be designed as a disk made of some heat-insulating material, such as quartz or ceramics and inserted in a hollow extension adjoining the bottom in such a manner that it is prestressed between the bottom and a portion of the bottom adjoining the said extension, that the annular membrane with its inner ring is pressed into the bottom portion and the cavity between the extension and the disk communicates with the cooling-liquid chamber. These measures can be conveniently applied to transducers comprising an annular membrane where deviations of the measuring pressure during temporary temperature influences have no direct bearing upon the temperature behavior of the membrane. With similar transducers error recordings in the event of a temporary rise of temperature (temperature shock) are explained by the fact that the heat flow from the bottom of the prestressing sleeve directly exposed to the effect of temperature is temporarily choked at the points of transition to the thin-walled portion of the sleeve. This is due to the fact that the sleeve material is a better heat conductor than the quartz column enclosed in the prestressing sleeve, so that an overwhelming proportion of the heat flow is radially deflected in an outward direction in the area of the sleeve bottom. The expansion of the prestressing sleeve as compared with that of the piezoelectric element consequently simulates a drop in pressure. The arrangement of the insulator according to the invention eliminates the localization of heat which has been responsible for the error recording. The heat insulator to be mounted under prestress in order to avoid clearance flexibility in the hollow extension of the prestressing sleeve and whose heat-transfer coefficient is considerably smaller than that of quartz, provides a blocking area of sorts preventing direct exchange of heat between the pressure medium as the heat carrier and the bottom of the prestressing sleeve to a considerable extent. Heat conveyed from the outside to the bottom porion of the hollow extension of the prestressing sleeve can therefore, flow away only through the relatively small cross-section of the outer wall of the hollow extension and is transmitted from these walls directly to the cooling water. Consequently, it appears particularly advisable to include also the interior of the hollow extension in the cooling-liquid system. Since with this type of transducer only a fraction of the heat conveyed on the side of the membrane actually reaches the thin-walled shell of the prestressing sleeve, irrespective of whether the heat supply is non-recurrent, temporary or continuous, conventional methods of transducer temperature compensation are bound to produce a poor effect. For example, a compensation disk made of aluminum, copper or the like metals, having a high coefficient of thermal expansion, to be inserted between the piezoelectric element and the bottom of the compensating disk for the purpose of balancing the different amounts of thermal expansion of the prestressing sleeve and the piezoelectric element enclosed therein, can now be made considerably thinner than formerly.

According to another feature of the invention, the temperature behavior can be further improved by designing the mid-portion of the membrane as a disk of greater thickness and by providing the said disk with an outwardly protruding plate-shaped extension overlapping the flexible portion of the membrane at least partly in spaced relation to the later. The flexible, thin-walled portion of the membrane which is naturally particularly sensitive to abrupt temperature variations is substantially protected by the plate-shaped extension from direct temperature attacks emanating from the measuring point. The hot pressure medium first reaches the plate-shaped extension of the disk-shaped mid-portion of the membrane which acts as a heat localizer due to its relatively large mass, heating the same only progressively so as to eliminate the influence of peak temperatures upon the adjacent transducer elements almost completely. As a result of the protection of the flexible portion of the membrane, this extremely sensitive part is affected by abrupt temperature changes only after the same have been attenuated to a considerable extent.

Apart from the thermal advantage of this type of transducer ensuring almost complete compensation of errors due to temporary temperature influences, the plate-shaped extension also affords effective protection of the sensitive flexible portion of the membrane against mechanical damage.

According to a further feature of the invention the annular surface of the plate-shaped extension facing the flexible portion of the membrane can be provided, at least in part, with a coating of some heat-insulating material, thereby producing a heat-insulating area between the outer surface of the plate-shaped extension directly exposed to temperature influences and the flexible portion of the membrane, as a result of which the exchange of heat between the hot pressure medium and the effective membrane surface diminishes still further. Consequently, abrupt temperature changes will affect the membrane to a negligible extent only. Obviously, an air gap must remain between the heat-insulating coating and the flexible portion of the membrane, so as to ensure free mobility of the membrane in the event of pressure variations.

Figure 2:
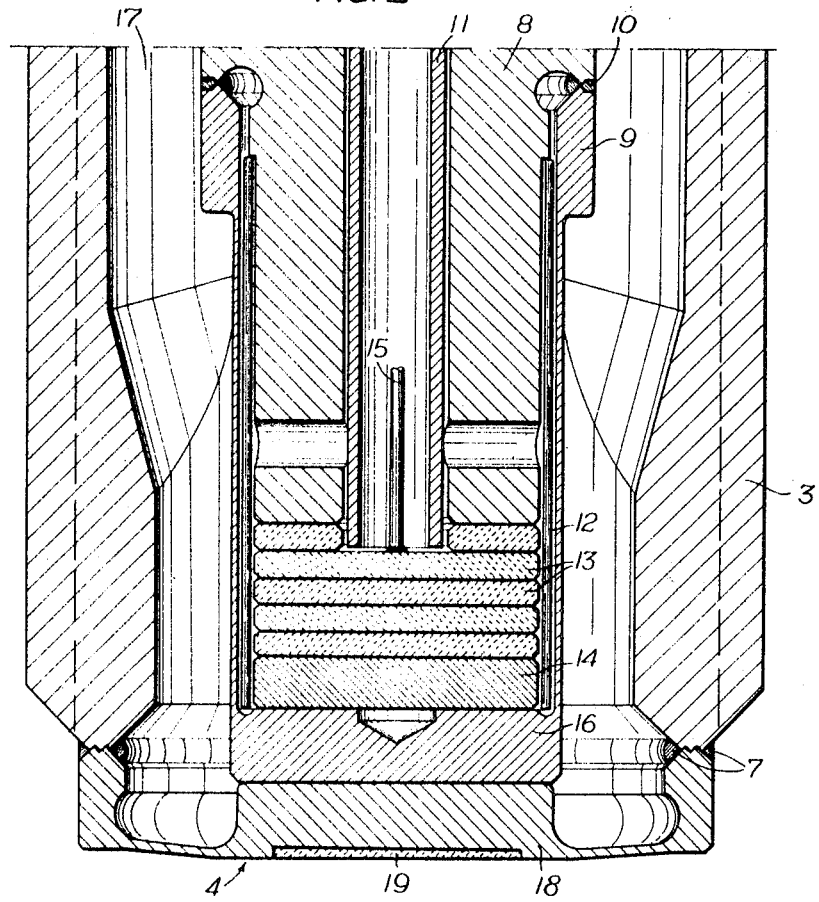

Further details of the invention will appear from the following description of several embodiments of the invention with reference to the accompanying drawings in which:

FIGURE 1 shows an elevation of the pressure transducer according to the invention, FIGURE 2 is an axial cross-sectional view of a preferred embodiment of the invention as restricted to the pertinent area, and FIGURES 3 through 6 each show a partial cross-sectional view of another embodiment of the invention.

The pressure transducer 1 includes the piezoelectric element inside a cylindrical transducer housing 2 with an offset threaded portion 3, the interior of which is closed on its front side by means of a membrane 4, the said piezoelectric element serving to take the pressure to be measured. A measuring wire 5 leading to the charge amplifier (not shown) emerges in the middle of the rear end of the housing 2 opposite the membrane 4. Adjoining the measuring wire 5 are two cooling-water connections 6 communicating with the cooling-water chamber 17 in the interior of the transducer housing 2.

The design of the transducers as illustrated in FIGS. 2, 3, 4 and 6 respectively differs from that of the transducer hereabove described only in that the bent-up rim of the membrane of the former is attached to the annular rear end of the threaded portion 3 by means of an inner and an outer weld 7. In the interior of the transducer housing 2 and in coaxial relation to same an offset cylindrical insert 8 is provided, to the shoulder of which a prestressing sleeve 9 is attached by means of annular welds 10. In the central bore of the cylindrical insert 8 an insulating tube 11 is inserted which extends slightly over and above the front end of the portion of the insert 8 protruding into the prestressing sleeve 9. The inner surface of the prestressing sleeve 9 is insulated almost over its entire length by means of a thin-walled Teflon sleeve 12.

Located inside the Teflon sleeve 12 is the piezoelectric element comprising a plurality of disk-shaped quartz layers 13, the said piezoelectric element being inserted under prestress between the bottom 16 of the prestressing sleeve 9 and the front end of the cylindrical insert 8, with the interpolation of a compensating disk made of aluminum, copper or any other metal having a high coefficient of thermal expansion. The piezoelectric element is connected with the measuring wire 5 by means of a connecting line 15 centrally extending through the insulating tube 11. To ensure greater clarity of the layout, the arrangement and connection, known per se, of the electrodes of the piezoelectric element have not been shown in the drawings.

According to the embodiment of the invention illustrated in FIG. 2, the membrane 4 is designed with an inwardly protruding cylindrical bulge 18 adjoining the bottom 16 of the prestressing sleeve 9 with its entire surface. On the outside of the reinforced mid-portion of the membrane a cylindrical recess is provided in which a heat-insulating coating 19 is located. This coating 19 protects the mid-portion of the membrane 4 against direct external temperature influences. Since in addition, the bulk of the membrane is considerably increased in this area by the cylindrical bulge 18, the temperature rise in the mid-portion of the membrane is considerably slower than if the membrane were of uniform thickness throughout. By the appropriate selection of the insulating material used for the coating 19 and by carefully dimensioning the cylindrical bulge 18, an even rise of temperature within the whole membrane 4 can be achieved in spite of the fact that much more favorable cooling conditions prevail in the thin-walled annular area of the membrane directly washed by the cooling water on its inner surface. A uniform rise of temperature in the membrane 4 precludes deformation due to thermal stress of the membrane 4 adjoining the prestressing sleeve 9 with a predetermined contact pressure. Nor will the prestress of the piezoelectric element, temperature-compensated per se by means of the compensating disk 14, be altered when the membrane 4 is subject to an abrupt temperature-shock treatment, for example.

Figure 3:
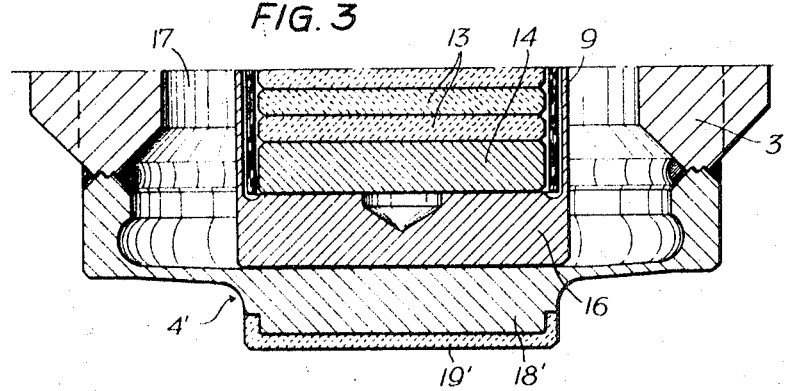
Figure 4:
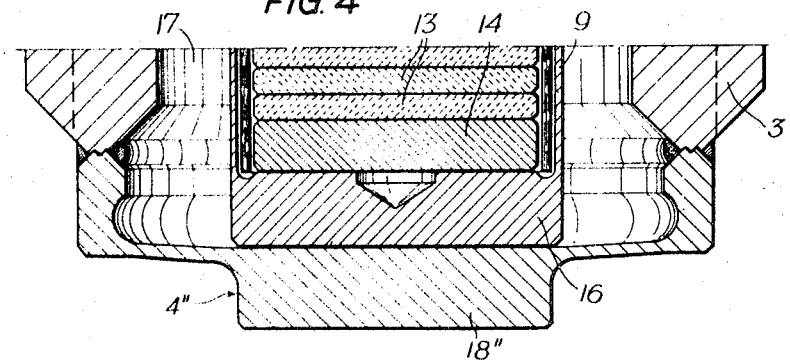

As shown in FIG. 3, the cylindrical bulge 18' of the membrane 4' can also be located at its periphery, the heat-insulating coating 19' extending not only over the front end but also over part of the lateral surface of the cylindrical bulge 18'.

With transducers subject to minor thermal stresses only, error recordings due to temporary temperature influences can be precluded by the provision of a cylindrical bulge 18" of the membrane 4" alone. In order to ensure retardation of the rise of temperature of this mid-portion of the membrane 4" directly exposed to external temperature influences, the cylindrical bulge 18" is designed with greater wall-thickness than in the embodiments illustrated in FIGURES 2 and 3, for the purpose of providing greater heat-absorption capacity.

Figure 6:
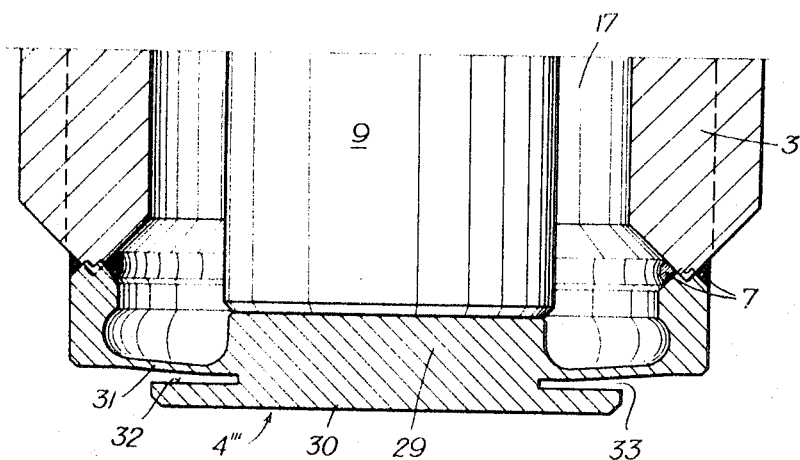

The membrane 4''' of the transducer illustrated in FIG. 6 is of greater thickness in its mid-portion and its shape is that of a cylindrical disk 29 with an outwardly protruding plate-shaped lug 30. The inwardly protruding front end of the said disk 29 rests with a tight fit on the bottom of the prestressing sleeve 9. The plate-shaped lug 30 of the disk 29 overlaps the flexible annular membrane member 31 in spaced relation to same so as to produce an annular gap 33 through which the membrane can be impinged upon by the measuring pressure. The width of the said annular gap is such as to ensure complete mobility of the flexible membrane member 31 in the event of pressure variations.

The disk-shaped mid-portion 29 of the membrane acts as a heat localizer following abrupt temperature variations of the hot pressure medium only slowly, thereby largely suppressing thermal stresses in the adjacent transducer elements, in particular in the prestressing sleeve 9, due to changes in temperature. The particularly sensitive flexible membrane portion 31 is effectively protected against the direct temperature influence of the hot pressure medium by means of the plate-shaped lug 30. In order to further increase this protective effect, the annular surface 32 facing the flexible portion 31 of the membrane is preferably provided, either partly or wholly, with a coating of some heat-insulating material. Of course, free mobility of the flexible portion 31 of the membrane must be assured also in that case.

Figure 5:
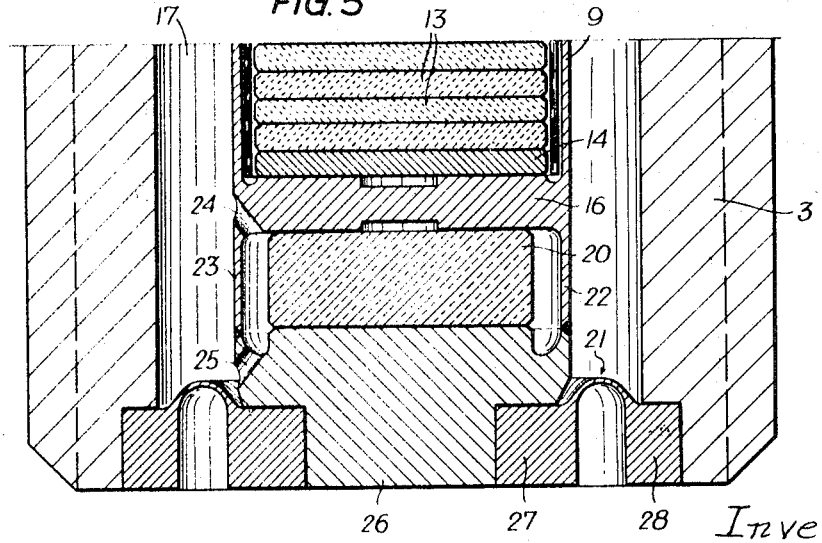

As appears from FIG. 5, with pressure transducers comprising an annular membrane 21, steps of a different nature will have to be taken in order to preclude erroneous pressure readings in the event of temporary temperature influences. Experience has shown that with similar transducers, wherein the outer rim of the membrane is usually directly and positively connected with the transducer housing and the inner rim of the membrane with the bottom of the prestressing sleeve, any rise of temperature, and in particular a temperature-shock treatment of the membrane end of the transducer at the transition from the bottom of the prestressing sleeve to its thin-walled shell will produce accumulation of heat causing rapid expansion of the prestressing sleeve, as a result of which the measuring instrument will record an actually non-existent sudden drop of pressure. The temperature rise of the piezoelectric element proper and that of the compensating disk provided for the balancing of temperatures is, however, slower so that balance between the expansions of different magnitude of the prestressing sleeve and of the piezoelectric element will be achieved after a certain period of time only.

With a view to eliminating these manifestations the prestressing sleeve 9 of the transducer shown in FIG. 5 is provided with a hollow extension 22 adjoining the bottom of the said prestressing sleeve. In the said extension 22 a quartz or ceramic disk 20 is inserted to serve as a heat insulator. The hollow extension 22 is closed by means of an offset cylindrical bottom body 26 towards the front end of the tranducer. Between the thin-walled shell of the extension 22 and the quartz or ceramic disk 20 an annular cooling-liquid chamber 23 is provided, which communicates with the cooling water chamber 17 of the transducer via connecting passages 24 and 25. The quartz or ceramic disk 20 is held under prestress between the bottom 16 and the bottom body 26 in order to preclude clearance flexibility between these members and to permit the transmission of both traction and pressure to the piezoelectric element. The annular membrane 21 is mounted with its inner ring 27 on the bottom body 26 and with its outer ring 28 on the threaded portion 3 of the transducer housing, by any convenient method such as by pressing.

The quartz or ceramic body 20 protects the bottom 16 of the prestressing sleeve 9 against heat penetrating through the bottom body 26 almost completely, so that a major portion of the heat is deflected in the direction of the thin-walled shell of the hollow extension 22 and there transferred almost in its entirety to the cooling water. Thus the prestressing sleeve 9 will be heated only slightly. Moreover, this rise of temperature will become effective after a certain period of time only, so that temporary thermal peak loads will have no bearing on the prestressing of the piezoelectric element. In that case too, thermal expansions with the transducer in a stationary condition are compensated in continuous operation by means of a compensating disk 14.

I claim:

1. A piezoelectric pressure transducer comprising a hollow cylindrical housing having an offset threaded portion, a membrane located on the front end of the said threaded portion of the housing, the said membrane closing the interior of the housing, a prestressing sleeve arranged in coaxial relation to and within the said housing, the bottom of the said prestressing sleeve being attached to the mid-portion of the said membrane, a piezoelectric element located inside the said prestressing sleeve, a cooling-liquid chamber defined by the outer surface of the said prestressing sleeve and by the internal surfaces of the housing and of the membrane, cooling-water connections provided on the housing and communicating with the said cooling-liquid chamber, a heat-flow retarding body arranged in front of the bottom of the said prestressing sleeve outside the interior of the prestressing sleeve containing the piezoelectric element.

2. A piezoelectric pressure transducer as claimed in claim 1, the said heat-flow retarding body being made of some heat-insulating material.

3. A piezoelectric pressure transducer as claimed in claim 1, the said heat-flow retarding body being designed as a heat localizer.

4. A piezoelectric pressure transducer as claimed in claim 2, having a coating of some heat-insulating material applied to the outer surface of the said membrane and forming the said heat-flow retarding body.

5. A piezoelectric pressure transducer as claimed in claim 2, comprising a disk made of some heat-insulating material and mounted on the outer surface of the said membrane and forming the said heat-flow retarding body.

6. A piezoelectric pressure transducer as claimed in claim 3, wherein the said membrane has a cylindrical mid-portion of greater wall-thickness than the rest of the membrane, the said mid-portion forming the said heat localizer.

7. A piezoelectric pressure transducer as claimed in claim 6, wherein the said mid-portion of the membrane being designed as an inwardly protruding lug, the said lug adjoining the bottom of the said prestressing sleeve with its entire surface, and presenting a cylindrical recess on its outside, and a heat-insulating coating being provided inside the said cylindrical recess, the said lug of the membrane and the said heat-insulating coating forming the said heat-flow retarding body.

8. A piezoelectric pressure transducer as claimed in claim 1, comprising an annular membrane consisting of an inner ring and an outer ring arranged in concentrical relation to the said inner ring, an arcuate flexible intermediate member connecting the said inner ring with the said outer ring, and further comprising a hollow cylindrical extension of the said prestressing sleeve adjoining the bottom of the said prestressing sleeve and having an offset cylindrical bottom body, the said bottom body being pressed into inner ring of the said annular membrane, a disk made of some heat-insulating material, such as quartz, inserted in the said hollow cylindrical extension and prestressed inside the extension, an annular cavity between the said disk and the wall of the hollow cylindrical extension, apertures extending through the wall of the said extension and connecting the said annular cavity with the said cooling liquid chamber of the transducer housing, said bottom body and the said disk of heat-insulating material together forming the said heat-flow retarding body.

9. A piezoelectric pressure transducer as claimed in claim 1, wherein the said membrane comprises a cylindrical mid-portion having an outwardly protruding plate-shaped lug overlapping the flexible portion of the said membrane in spaced relation to the latter, the said central portion and the plate-shaped bulge of the membrane forming the said heat-flow retarding body.

10. A piezoelectric pressure transducer as claimed in claim 9, wherein a coating of heat-insulating material is applied to the annular surface of the said plate-shaped lug of the mid-portion of the membrane facing the flexible portion of the membrane.

References Cited

UNITED STATES PATENTS

| | | | |
|---|---|---|---|
| 2,917,642 | 12/1959 | Wright | 310—8.7 |
| 3,031,591 | 4/1962 | Cary | 310—8.7 |
| 3,146,360 | 8/1964 | Marshall | 310—8.7 |
| 3,150,274 | 9/1964 | Rishinger | 310—8.9 |
| 3,158,763 | 11/1964 | Busch | 310—8.9 |
| 3,171,989 | 3/1965 | Hatschek | 310—8.9 |
| 3,281,613 | 10/1966 | Hatschek | 310—8.7 |
| 3,349,259 | 10/1967 | Kistler | 310—8.7 |
| 3,364,368 | 1/1968 | Sonderegger | 310—8.9 |
| 3,393,331 | 7/1968 | Puckett | 310—8.7 |

J. D. MILLER, Primary Examiner

U.S. Cl. X.R.

310—8, 9

UNITED STATES PATENT OFFICE
CERTIFICATE OF CORRECTION

Patent No. 3,461,327 August 12, 19

Rudolf Zeiringer

It is certified that error appears in the above identified patent and that said Letters Patent are hereby corrected as shown below:

In the heading to the printed specification, line 7, "1,149/69" should read -- 1,149/66 --.

Signed and sealed this 19th day of May 1970.

(SEAL)
Attest:

Edward M. Fletcher, Jr.
Attesting Officer

WILLIAM E. SCHUYLER, JR
Commissioner of Patents

UNITED STATES PATENT OFFICE
CERTIFICATE OF CORRECTION

Patent No. 3,461,327     Dated August 12, 1969

Inventor(s) Rudolf Zeiringer

It is certified that error appears in the above-identified patent and that said Letters Patent are hereby corrected as shown below:

The incorrect date of February 8, 1969, appearing at line 7 in the heading of the printed specification, should be corrected to read --February 8, 1966--.

SIGNED AND SEALED
DEC 15 1970

(SEAL)
Attest:

Edward M. Fletcher, Jr.
Attesting Officer

WILLIAM E. SCHUYLER, JR.
Commissioner of Patents